March 7, 1939.　　　　A. J. DUAEI　　　　2,149,589
MEANS FOR STACKING PIPE
Filed Sept. 7, 1937
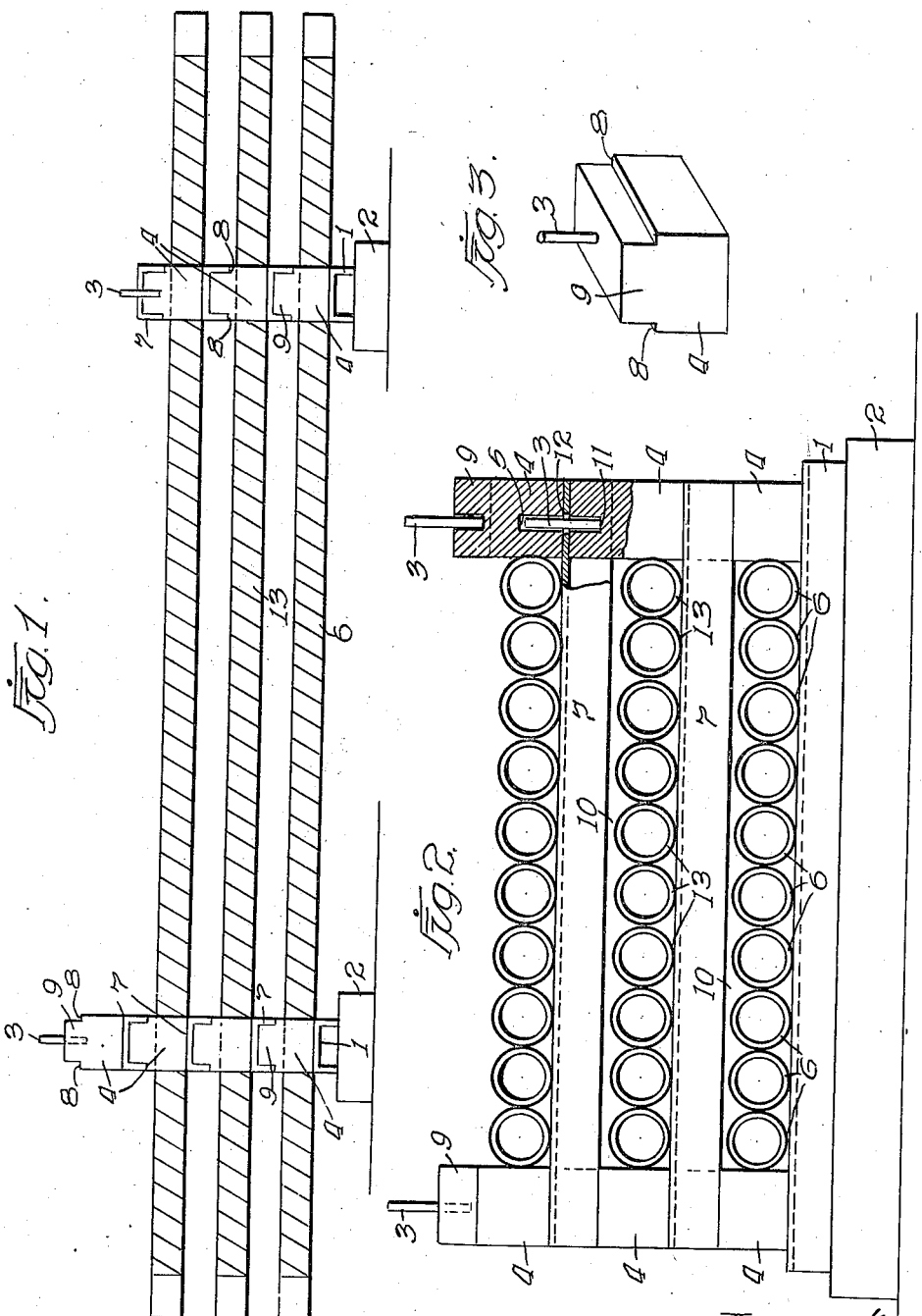
Witness:
Harry R. L. White
Inventor:
Alexander Duaei
By George H. Simmons
Atty.

Patented Mar. 7, 1939

2,149,589

UNITED STATES PATENT OFFICE 2,149,589

MEANS FOR STACKING PIPE

Alexander J. Duaei, Lombard, Ill.

Application September 7, 1937, Serial No. 162,631

7 Claims. (Cl. 211—60)

This invention relates to means for stacking pipe and has for its principal object the production of a new and improved pipe rack.

A further object of the invention lies in the provision of a rack for supporting a plurality of layers of pipe, one above the other, in such manner that each pipe supports only its own weight.

Still another object of the invention provides a rack composed of sectional units which may be combined together to form a stack of any desired dimensions.

Further objects of the invention not specifically enumerated here will be apparent from the detailed description and claims which follow, reference being had to the accompanying drawing in which a preferred embodiment of the invention is shown by way of example and in which Figure 1 is a side elevational view of a pipe stack employing the rack of the present invention;

Figure 2 is an end elevational view, partly in section, of the pipe stack shown in Figure 1, and Figure 3 is a perspective view of a supporting block.

Pipes that are to be used in pipe lines carrying gas, oil or water are frequently treated with a rust-preventing compound and wrapped with one or more layers of a protective material such as asbestos or paper. The pipe thus coated cannot be handled as roughly as can a bare pipe inasmuch as the rust-preventing compound, to be effective, must extend over the outer surface of the pipe in an unbroken film. Compounds such as are commonly used for this purpose are rather fragile and the film on the pipe is apt to be ruptured unless the pipe is carefully handled. The protective coating of asbestos or paper likewise requires careful handling.

It is the practice of companies using pipe of this kind to ship large quantities of pipe to a coating mill where the rust-preventing compound and protective papers are applied and the pipe is then stored until needed for use.

If treated pipe were to be stacked in the ordinary manner, with each layer of pipe supporting the weight of the layers above it, the lower layers of pipe would be subjected to so much pressure that the rust-preventing coating and protective paper would be crushed and damaged to such an extent that the purpose of the coating would be defeated.

In accordance with the teachings of my invention, pipe that has been treated is stacked until needed for use in a pipe rack which supports the pipe in such a manner that each layer of pipe in the stack and each pipe in the layer supports only its own weight. By this arrangement the danger of the protective coating on the pipe being damaged is minimized.

Pipes received from the pipe mill are frequently in 20 foot lengths and when the pipe is of relatively large diameter considerable weight is encountered. In order to facilitate handling the coated pipes in completing the stack and in removing the pipes therefrom when needed, I have provided a pipe rack constructed of sectional units so that the rack may be built simultaneously with the stack and so that the top side of the stack is always free and clear so that pipes may be placed thereon by a crane or otherwise.

By constructing the vertical units that go to make up the pipe racks in sizes corresponding to the sizes of pipes to be stacked, there is little waste space in the stack and the volume of storage space available may be used advantageously. The rack so constructed may be extended to great heights and the stack thus formed is solid and substantial and not liable to be overturned should a truck or other similar object accidentally run into it.

Referring now to the drawing in more detail, the rack of my invention comprises a plurality of lengths of channel bars 1 which are laid with their webs uppermost and their flanges depending downwardly. The lower ones of the channel are laid directly upon suitable rack foundations 2.

The webs of the channels 1 are perforated a short distance from the ends of the channels and a suitable pin such as 3 is placed in the perforations in channel 1 and projects thereabove. Weight supporting spacing blocks 4, best seen in Figure 3, are provided with a flat bottom surface that rests squarely upon the web of the channels 1. A socket 5 is formed in the block and registered with the pin 3 so as to fix the block with respect to the channel.

The lower layer of pipe indicated at 6 is then placed upon the channels 1 between the blocks 4. The length of the channel 1 will obviously govern the distance between the blocks 4 and thereby determine the number of pipes that can be stored in a single layer. The length of the channel bar may be determined by dimensions of the space in which the stack is to be built, however, I have found that a channel length of approximately four feet is convenient and practical in most instances.

After the bottom layer 6 of pipe has been set, second channels 7 are laid over the layer and registered with the upper ends of the block.

As will be seen best in Figure 3 the upper ends of the blocks 4 are cut away to form shoulders 8 separated by a tongue-like portion 9. The shoulders and tongue-like portion are designed to fit in between the flanges of the channel bars so that the bottom edges of the flange will rest upon the shoulders 8 and the upper face of the block 4 will rest against the lower face of the web. Preferably the tongue 9 fits rather snugly in the space between the flanges of the channel bar.

The shoulders 8 are located above the lower face of the block a distance slightly greater than the outside diameter of the coated pipe so that, as indicated at 10, Figure 2, there will be a small clearance between the lower edges of the flanges of channel bars 7 and the upper surface of the pipes in layer 6. The amount of this clearance need not be great and I have found that clearances of approximately one-half an inch are satisfactory for all purposes.

The upper faces of the block 4 contain a second socket 11 which registers with the perforation 12 in the web of channel bars 7. A pin such as 3 is fitted in the socket 11 and extends through the bar and thereabove, this pin projecting into the socket 5 in the registered one of a second set of spacing blocks that are placed upon the top side of channels 7. A second layer of pipe 13 is then placed upon the channel and the process herein enumerated is continued until the stack is built to the desired height.

The weight of the lower layer 6 of the pipe is carried by channel 6 which rests directly upon the foundation 2, the weight of the second layer 13 and of the layers thereabove is carried by the channel bars which support the layers through the blocks 4 to the foundation. The channel bars are provided with deep flanges and the weight of a layer of pipe is not sufficient to cause the bar to sag and come into contact with the layer beneath it. The pipes in the layer are each supported by the broad web section of the channel bar and the weight is distributed so as to prevent injury to the coating. By this arrangement, each layer of pipe is supported independently of the other layers and the coatings on the pipe of any layer will not be damaged by the weight of pipes above it.

The stack thus formed is solid and capable of withstanding very appreciable bumps without destroying the stack. Should a truck accidentally bump into the end of the stack as it is being moved up for the purpose of receiving a load of pipe, no great damage will result.

In a pipe coating mill or warehouse where a plurality of different sizes of pipes are being handled, it is advantageous to have a set of blocks such as 4 for each size of pipe and these blocks may be painted in distinctive colors so that they will be readily recognized and the workmen constructing the stacks will not be liable to intermingle blocks of various sizes.

The improved rack of my invention is possessed of many advantages. It is economical to construct, may be built up to any desired dimension, when not in use can be readily stored, and the upper surface of the stack is always free and clear so that pipes may be readily placed on or removed from the stack by an overhead crane or otherwise.

While I have chosen to illustrate my invention by describing its use in connection with the building of a rack for storing pipe, it will be apparent that the rack thus formed may be put to a number of other uses and therefore I am not to be limited by the specific example described by way of illustration.

Having thus complied with the statutes and shown and described a preferred embodiment of my invention, what I consider new and desire to have protected by Letters Patent, is pointed out in the appended claims.

What is claimed is:

1. In a pipe stacking rack, a channel bar having perforations in its web near its ends, a supporting block registered with each end of said bar and having one end shaped to fit between the flanges and against the web of said channel bar, there being a socket in each block registered with a perforation in said web, and a pin disposed in said socket and extending through the registered perforation and above said web.

2. Pipe stacking means comprising a plurality of blocks having end sockets, shoulders on said blocks spaced near one end thereof, channel bars fitting over the blocks with the flanges of the channel bars resting on the shoulders and the ends of the blocks on the webs of the channels, said webs being perforated to register with said sockets, and pins extending from the socket in one block through the perforation registered therewith and into the socket in the adjacent block.

3. Pipe stacking means comprising, channel members adapted to be placed web up to support the pipe, spacing blocks resting on a lower channel and fitting into an upper channel to space the channels apart, and pin means extending through the channels and fitting loosely into the blocks for holding the assembly together.

4. Pipe stacking means for supporting a plurality of layers of pipe one above the other comprising, a channel member disposed beneath the bottom layer of pipe, said channel being disposed web up and extending transversely of the layer, spacing blocks resting on said web at the ends of the layer, means engaging said blocks and channel and holding said spacing blocks on said channel, a second channel resting on said blocks, the flanges of the channel extending alongside the upper portion of the blocks, a second set of blocks resting on said second channel and pin means extending through the second channel and into said first and second sets of blocks and holding the assembly together.

5. In a pipe stacking rack, a channel bar disposed with its web up and flanges down, said web having perforations near the ends of the bar, blocks resting on said web near the ends of the bar, there being sockets in said blocks registered with said perforations, pin means in said sockets extending through said perforations, shoulders on said blocks near the upper end thereof, narrowed portions of the blocks extending above said shoulders, a second channel bar disposed with its flanges on said shoulders and with said narrowed portions fitted between the flanges and against the web, there being sockets in the narrowed portions of said blocks and perforations in the web of said second channel bar registered therewith, and pin means in said sockets extending through the perforations in said second channel.

6. A pipe rack for supporting layers of pipe one above the other with the layers separated, comprising, a plurality of independent sections, each section comprising a substantially horizontally disposed pipe supporting member and a pair of vertically diisposed spacing blocks registered with the ends of said member, there being perforations in said members and sockets in said spacing blocks registered therewith, and pins loosely fitted in registered sockets and extending through the perforations in said members and holding said sections together.

7. Pipe stacking means comprising a plurality of blocks having end sockets, said blocks having a main body portion and a smaller projecting portion, shoulder means at the junction of said main and projecting portions, bars extending between pairs of said blocks and resting on the ends thereof, flange means depending from said bars and engaging said shoulder means, said flange means extending alongside said projecting portions and holding said blocks from turning with respect to said bars, there being perforations in said bars registered with said end sockets in said blocks, and pin means in said sockets extending through said perforations to hold said blocks from sliding with respect to said bars.

ALEXANDER J. DUAEI.